(No Model.)

L. A. COUTEAU.
REAPING AND MOWING MACHINE.

No. 315,387. Patented Apr. 7, 1885.

WITNESSES

INVENTOR

United States Patent Office.

LOUIS A. COUTEAU, OF LÉONVILLE, FRANCE.

REAPING AND MOWING MACHINE.

SPECIFICATION forming part of Letters Patent No. 315,387, dated April 7, 1885.

Application filed March 6, 1885. (No model.) Patented in France June 11, 1884, No. 162,682, and in England June 13, 1884, No. 8,944.

*To all whom it may concern:*

Be it known that I, LOUIS ADRIEN COUTEAU, a citizen of France, residing at Léonville, in the Republic of France, have invented new and useful Improvements in Reaping and Mowing Machines, (for which I have obtained Letters Patent in France, No. 162,682, bearing date June 11, 1884, and in England, No. 8,944, bearing date June 13, 1884,) of which the following is a specification.

My invention relates to the washing and cleaning, during the whole time the machine is in operation, or at intervals, of the finger-bar and cutting-blades of reaping-machines of all kinds, so as to prevent the blades, fingers, guides, and slides from becoming clogged by wetting and throwing off the soil which collects in these parts in crossing mole-hills or other irregularities of the soil. I attain these objects by the improved machine illustrated in the accompanying drawings, in which—

Figure 1:
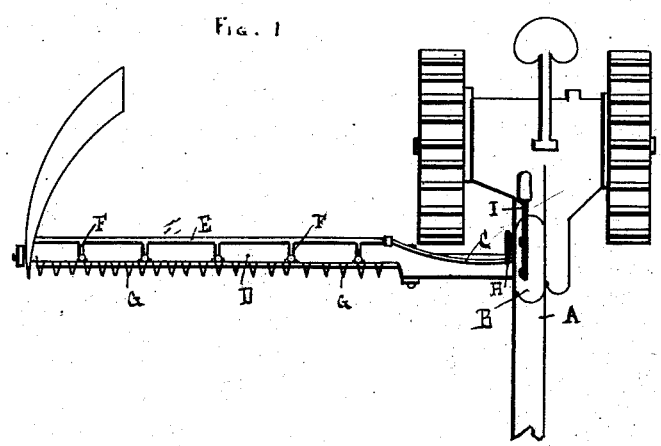
Figure 2:
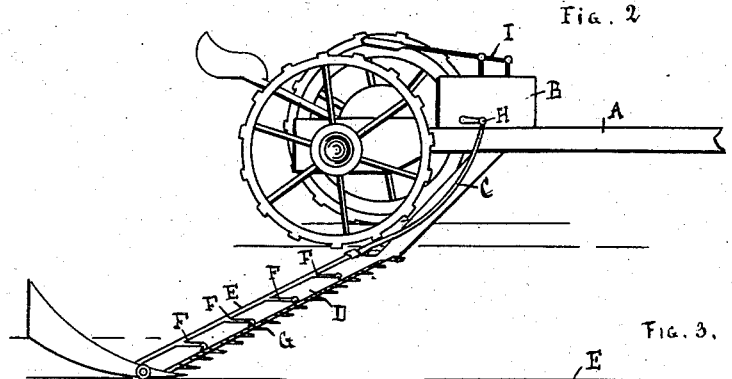
Figure 3:
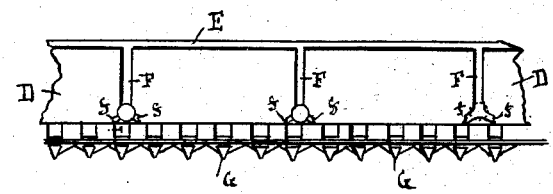

Figure 1 is a top view of a reaping and mowing machine to which my said invention is applied. Fig. 2 is a side view of the same, and Fig. 3 an enlarged top view of a part of the knife-bar and cutting-blades with the washing apparatus.

In these figures the same letters of reference indicate corresponding parts.

My invention consists in placing on the frame A of the machine a small reservoir, B, filled with water or other liquid, and placed in communication by a flexible pipe, C, allowing the knife-bar D to be raised, with a pipe, E, furnished with more or less branch pipes, F, at the end of which are small nozzles $ff$, turning to right and left, and thus bringing a small jet of water upon the knife-bar and cutting-blades G. The exhaust-nozzle from the reservoir is furnished with a tap, H, to turn the water on and off, and regulate the supply of water or other liquid for the knife-bar and cutting-blades.

The water may be forced from the reservoir by means of a pump, I, worked by the conductor or the carrying-wheels.

Any other arrangement may be adopted to obtain the results which I have in view without departing from the entirely new principle on which my invention is based—*i. e.,* the washing and cleaning of the saw or cutting blades of reaping and mowing machines.

What I claim, and desire to secure by Letters Patent, is—

In the construction of reaping and mowing machines of all kinds, the combination, with the knife-bar D and the cutting-blades G, of the reservoir B, the flexible tube C, the pipe E, branches F, tap H, and pump I, substantially as described, for the purpose set forth.

L. A. COUTEAU.

Witnesses:
CH. BROWN,
N. BONNEVILLE.